UNITED STATES PATENT OFFICE.

WILLIAM L. SHARETTS, OF BALTIMORE, MARYLAND.

SALVE.

SPECIFICATION forming part of Letters Patent No. 229,014, dated June 22, 1880.

Application filed April 26, 1880. (No specimens.)

*To all whom it may concern:*

Be it known that I, WILLIAM L. SHARETTS, a citizen of the United States, residing at Baltimore city, State of Maryland, have invented a new and useful composition of matter to be used for healing old running sores, scalds, burns, &c., of which the following is a specification.

My composition consists of the following ingredients, combined in the proportions stated, viz: crude petroleum, two and one-half gallons; crude turpentine, twenty pounds; prepared calamine, twenty pounds; bees-wax, twenty pounds; lard, forty pounds; lime-water, forty gallons—these ingredients to be thoroughly mingled by agitation. The solution or composition is poured into a vessel containing the forty (40) gallons lime-water to harden the same, and the compound is again thoroughly mixed and marked "Ready for use."

I claim—

The herein-described composition of matter, to be used for healing old running sores, scalds, burns, boils, felons, and especially for ladies' gathered breasts, consisting of petroleum, turpentine, calamine, bees-wax, lard, and lime-water, in the proportions specified.

WILLIAM L. SHARETTS. [L. S.]

Witnesses:
JOHN GIBSON,
JAS. J. C. SCULLEY.